US012715964B2

(12) United States Patent
Kobayashi et al.

(10) Patent No.: US 12,715,964 B2
(45) Date of Patent: Aug. 25, 2026

(54) MODIFIED ETHYLENE-VINYL ALCOHOL RESIN AND PRODUCTION METHOD THEREFOR

(71) Applicant: Mitsubishi Chemical Corporation, Tokyo (JP)

(72) Inventors: Yuuta Kobayashi, Tokyo (JP); Tomotake Yano, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 738 days.

(21) Appl. No.: 18/107,986

(22) Filed: Feb. 9, 2023

(65) Prior Publication Data

US 2023/0192963 A1 Jun. 22, 2023

Related U.S. Application Data

(63) Continuation of application No. PCT/JP2021/031209, filed on Aug. 25, 2021.

(30) Foreign Application Priority Data

Aug. 31, 2020 (JP) ................................. 2020-145921

(51) Int. Cl.

| | |
|---|---|
| ***C08G 81/02*** | (2006.01) |
| *C08G 63/08* | (2006.01) |
| *C08L 23/0861* | (2025.01) |
| *C08L 67/04* | (2006.01) |

(52) U.S. Cl.

CPC ........... *C08G 81/027* (2013.01); *C08G 63/08* (2013.01); *C08L 23/0861* (2013.01); *C08L 67/04* (2013.01)

(58) Field of Classification Search

CPC ....... C08G 81/027; C08G 63/08; C08L 67/04; C08L 23/0861

See application file for complete search history.

(56) References Cited

FOREIGN PATENT DOCUMENTS

| | | | |
|---|---|---|---|
| EP | 0787755 | A2 | 8/1997 |
| JP | H09-208638 | A | 8/1997 |
| JP | 2019-104828 | A | 6/2019 |
| JP | 2019-163378 | A | 9/2019 |
| JP | 2019-163379 | A | 9/2019 |
| JP | 2020-090583 | A | 6/2020 |
| WO | 2006/097656 | A1 | 9/2006 |

OTHER PUBLICATIONS

Park et al (Grafting of Polycaprolactone onto Poly(ethylene-co-vinyl alcohol) and Application to Polyethylene-Based Bioerodable Blends, Journal of Polymer Science: Part B: Polymer Physics, vol. 40, 2561-2569 (2002), published on Dec. 2002.*

Zhao et al (Poly[ethylene-co-(vinyl alcohol)]-graftPoly(e-caprolactone) by Reactive Extrusion, 2—Parameter Analysis, Macromol. Mater. Eng. 2009, 294, 651-657), Published online: Sep. 11, 2009.*

Office Action issued Mar. 27, 2024 for the Chinese Patent Application No. 202180055790.1.

Extended European Search Report issued Jan. 31, 2024 for European Patent Application No. 21861631.6.

International Preliminary Report on Patentability and Written Opinion issued in related International Patent Application No. PCT/JP2021/031209 dated Mar. 9, 2023.

International Search Report issued in related International Patent Application No. PCT/JP2021/031209 dated Oct. 26, 2021.

Office Action issued in corresponding Japanese Patent Application No. 2022-545679, dated May 7, 2025.

Office Action issued in corresponding Chinese Patent Application No. 202180055790.1 dated Jun. 14, 2024.

Office Action issued in counterpart Chinese Patent Application No. 202180055790.1 dated Jul. 18, 2023.

* cited by examiner

*Primary Examiner* — Gregory Listvoyb

(74) *Attorney, Agent, or Firm* — Morgan, Lewis & Bockius LLP

(57) ABSTRACT

A modified EVOH resin comprising aliphatic polyester units, wherein an average chain length of the aliphatic polyester units in the modified EVOH resin is 1.5 or more. A significant decrease in melting point is suppressed in the modified EVOH resin.

10 Claims, No Drawings

MODIFIED ETHYLENE-VINYL ALCOHOL RESIN AND PRODUCTION METHOD THEREFOR

RELATED APPLICATIONS

This application is a continuation of International Application No. PCT/JP2021/031209, filed on Aug. 25, 2021, which claims priority to Japanese Patent Application No. 2020-145921, filed on Aug. 31, 2020, the entire contents of each of which being herein incorporated by reference.

TECHNICAL FIELD

The present disclosure relates to a modified ethylene-vinyl alcohol resin comprising aliphatic polyester units and a method for producing the same. More specifically, the present disclosure relates to a modified ethylene-vinyl alcohol resin comprising aliphatic polyester units having average chain length of 1.5 or more, and a method for producing the same.

BACKGROUND ART

Ethylene-vinyl alcohol resins (hereinafter sometimes referred to as "EVOH resins") have very strong intermolecular force due to hydrogen bonds between hydroxyl groups in the polymer side chains. EVOH resins have high crystallinity and strong intermolecular force even in amorphous portions, so it is difficult for gas molecules and the like to pass through a film made of such an EVOH resin. Therefore, a film made of an EVOH resin exhibits an excellent gas barrier property.

However, EVOH resins have a disadvantage—they are hard and brittle, and hence they lack flexibility. Therefore, there is a problem that, when such an EVOH resin is used for packaging materials or molding materials, cracks and pinholes occur due to bending fatigue if they are repeatedly folded, thereby making it impossible to maintain its excellent properties.

As a means for solving such problems, a modified EVOH resin in which aliphatic polyester is grafted onto the hydroxyl groups through a ring-opening polymerization reaction of lactones is proposed (see, for example, PTL 1).

RELATED ART DOCUMENT

Patent Document

PTL 1: JP-A-HEI9(1997)-208638

SUMMARY

However, while the modified EVOH resin of PTL 1 is more flexible than an unmodified EVOH resin, the melting point is significantly decreased, thereby resulting in lower heat resistance and limiting its use for instances where heat resistance is required.

The present disclosure provides a modified EVOH resin in which a significant decrease in melting point is suppressed.

The inventors of the present disclosure conducted intensive studies in view of the foregoing. As a result, the inventors found that, where the average chain length of the aliphatic polyester units is 1.5 or more in a modified EVOH resin containing aliphatic polyester units, the aforementioned problem can be solved.

Specifically, the present disclosure includes the following embodiments:

[1] A modified ethylene-vinyl alcohol resin comprising aliphatic polyester units, wherein an average chain length of the aliphatic polyester units in the modified ethylene-vinyl alcohol resin is 1.5 or more.

[2] The modified ethylene-vinyl alcohol resin according to [1], wherein the modified ethylene-vinyl alcohol resin has a modification rate of 1.5 mol % or more.

[3] The modified ethylene-vinyl alcohol resin according to [1] or [2], wherein the modified ethylene-vinyl alcohol resin further comprises at least one selected from the group consisting of tin, zinc, and titanium, wherein a total content of the tin, the zinc, and the titanium is 25 μg/g or more.

[4] The modified ethylene-vinyl alcohol resin according to any one of [1] to [3], wherein the aliphatic polyester unit comprises a ring-opening polymer of lactones.

[5] The modified ethylene-vinyl alcohol resin according to any one of [1] to [4], wherein the modified ethylene-vinyl alcohol resin is an ethylene-vinyl alcohol resin modified by using at least one of a tin compound and a zinc compound as a ring-opening polymerization catalyst.

[6] A method for producing the modified ethylene-vinyl alcohol resin according to any one of [1] to [5], comprising ring-opening polymerizing the lactones by using at least one ring-opening polymerization catalyst selected from the group consisting of a tin compound, a zinc compound, and a titanium compound in an extruder with the ethylene-vinyl alcohol resin present in the extruder.

[7] The method for producing the modified ethylene-vinyl alcohol resin according to [6], wherein the ring-opening polymerization catalyst is at least one of the tin compound and the zinc compound.

[8] The method for producing the modified ethylene-vinyl alcohol resin according to [6] or [7], wherein an amount of the ring-opening polymerization catalyst is over 1 part by weight based on 100 parts by weight of the lactones.

The modified EVOH resin of the present disclosure contains aliphatic polyester units and the average chain length of the aliphatic polyester units therein is 1.5 or more, whereby significant decrease in the melting point is suppressed.

DESCRIPTION OF EMBODIMENTS

Preferred embodiments of the present disclosure will hereinafter be described in detail by way of example.

In the present disclosure, an expression "X and/or Y (wherein X and Y are each a given structure)" means at least one of X and Y. As such, the expression has three meanings including X alone, Y alone, and a combination of X and Y.

<Description of Modified EVOH Resin>

The modified EVOH resin, according to the present disclosure, is a modified EVOH resin containing aliphatic polyester units. The aliphatic polyester unit is preferably a ring-opening polymer of lactones from the viewpoint that it reacts more easily, that breeding and adhesion failure occur less frequently, that the amount of evaporation caused by melt-molding is smaller, and that the working environment is less polluted. It is also preferred that the aliphatic polyester units are bonded to the side chains of the EVOH resin from the viewpoint of ensuring the gas barrier property and flexibility.

Preferred examples of the modified EVOH resin include, for example, an EVOH resin onto which aliphatic polyester is grafted. Specifically, such an EVOH resin can be obtained by a ring-opening polymerizing reaction of lactones and a graft reaction in the presence of the EVOH resin.

The aliphatic polyester is formed on the hydroxyl groups, which are placed at the terminal of the EVOH resin by a graft reaction.

The graft reaction of lactones in the presence of the EVOH resin will hereinafter be described.

[EVOH Resin]

First, the EVOH resin that is a material of the modified ethylene-vinyl alcohol resin of the present disclosure will be described.

The EVOH resin to be used in the present disclosure is typically a thermoplastic resin obtained by saponifying an ethylene-vinyl ester copolymer that is a copolymer of ethylene and a vinyl ester monomer. As the vinyl ester monomer, vinyl acetate is generally used from the viewpoint of economy. A known polymerization method such as solution polymerization method, suspension polymerization method or emulsion polymerization method may be utilized for polymerization of ethylene and the vinyl ester monomer. In general, a solution polymerization method using methanol as a solvent is utilized. The saponification of the resulting ethylene-vinyl ester copolymer may be achieved by a known method.

The EVOH resin mainly contains ethylene structural units and vinyl alcohol structural units, and further contains a small amount of vinyl ester structural units left unsaponified.

The amount of the ethylene structural units in the EVOH resin to be used in the present disclosure is typically 20 mol % to 60 mol %, preferably 25 mol % to 50 mol %, and particularly preferably 29 mol % to 45 mol %. If the amount is too small, flexibility tends to be deteriorated, and, if the amount is too large, on the other hand, the gas barrier property tends to be insufficient.

The amount of the ethylene structural units can be measured, for example, in conformity with ISO 14663.

The saponification degree of the vinyl ester component in the EVOH resin is typically 80 mol % to 100 mol %, preferably 90 mol % to 99.99 mol %, and particularly preferably 99 mol % to 99.99 mol %. If the saponification degree is too low, flexibility tends to be deteriorated.

The saponification degree of the vinyl ester component can be measured, for example, in conformity with JIS K6726 (with the use of a solution obtained by homogenously dissolving the EVOH resin in a water/methanol solvent).

The EVOH resin typically has a melt flow rate (MFR) of 1 g to 50 g/10 minutes, preferably 1.5 g to 25 g/10 minutes, and particularly preferably 2 g to 20 g/10 minutes (as measured at 210° C. with a load of 2,160 g). If the MFR of the EVOH resin is too high, the barrier property tends to be deteriorated. If the MFR of the EVOH resin is too low, on the other hand, flexibility tends to be deteriorated.

A mixture of two or more EVOH resins having different ethylene contents, saponification degrees, and MFRs may be used, as long as the average values thereof satisfy the above-mentioned conditions.

The EVOH resin to be used in the present disclosure may further contain structural units derived from comonomers listed below. Examples of the comonomers include: α-olefins such as propylene, isobutene, α-octene, α-dodecene, and α-octadecene; hydroxy-group-containing α-olefins such as 3-buten-1-ol, 4-penten-1-ol, 3-butene-1,2-diol, and derivatives of the hydroxy-group-containing α-olefins such as esterified products thereof and acylated products thereof; unsaturated carboxylic acids or salts thereof, partial alkylesters, complete alkylesters, nitriles, amides or anhydrides thereof; unsaturated sulfonic acids or salts thereof; vinylsilane compounds; vinyl chloride; and styrene.

Post-modified EVOH resins, such as a urethanized, acetalized, cyanoethylated or oxyalkylenated EVOH resin may be used.

Among the above-described modified products, an EVOH resin having a side chain into which a primary hydroxyl group has been incorporated by copolymerization is preferable from the viewpoint of good secondary moldability such as moldability in a stretching treatment and vacuum/air pressure forming, and an EVOH resin having a side chain with a 1,2-diol structure is more preferable.

[Lactones]

Lactones are not particularly limited as long as they are lactones with 3 to 10 carbon atoms constituting a ring that forms an aliphatic polyester through ring-opening polymerization. Such lactones are represented by the following general formula (1) below when they have no substituents, where n is an integer of 2 to 9. Preferably, n is 4 or 5. Also, in the general formula (1) below, any carbon atom of the alkylene chain $-(CH_2)_n-$ may have at least one substituent such as a lower alkyl group or lower alkoxy group with about 1 to 8 carbon atoms, a cycloalkyl group, a phenyl group, or an aralkyl group.

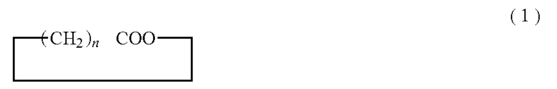

(1)

Specific examples of the lactones include β-propiolactones, γ-butyrolactones, ε-caprolactones, and δ-valerolactones.

Examples of the β-propiolactones include β-propiolactone and dimethylpropiolactone.

Examples of the γ-butyrolactones include butyrolactone, γ-valerolactone, γ-caprolactone, γ-caprylolactone, γ-laurolactone, γ-palmitolactone, γ-stearolactone, crotonolactone, α-angelicalactone, and β-angelicalactone.

Examples of the ε-caprolactones include monoalkyl-ε-caprolactones such as ε-caprolactone, monomethyl-ε-caprolactone, monoethyl-ε-caprolactone, monodecyl-ε-caprolactone, monopropyl-ε-caprolactone, and monodecyl-ε-caprolactone; dialkyl-ε-caprolactones with two alkyl groups respectively serving as substituents on carbon atoms at positions other than the ε-position; trialkyl-ε-caprolactones with three alkyl groups respectively serving as substituents on carbon atoms at positions other than the ε-position; alkoxy-ε-caprolactones such as ethoxy-ε-caprolactone; cycloalkyl-lactones such as cyclohexyl-ε-caprolactone; aralkyl-ε-caprolactones such as benzyl-ε-caprolactone; and aryl-ε-caprolactones such as phenyl-ε-caprolactone.

Examples of the δ-valerolactones include 5-valerolactone, 3-methyl-5-valerolactone, 3,3-dimethyl-5-valerolactone, 2-methyl-5-valerolactone, and 3-ethyl-5-valerolactone.

These lactones may be used alone, or two or more of these may be used in combination.

The lactones to be used in the present disclosure are not particularly limited, but ε-caprolactones and δ-valerolactones are preferred from the viewpoint of reactivity, and ε-caprolactones are more preferred from the viewpoint that it is available more easily at lower costs.

<Modified EVOH Resin Production Method>

The modified EVOH resin according to the present disclosure can be obtained typically in the step of ring-opening polymerizing lactones by using at least one ring-opening polymerization catalyst selected from the group consisting of a tin compound, a zinc compound, and a titanium compound in the presence of an EVOH resin in an extruder.

Exemplary methods for obtaining the modified EVOH resin include a method including steps of mixing an EVOH resin, lactones, and at least one ring-opening polymerization catalyst selected from the group consisting of a tin compound, a zinc compound, and a titanium compound together in a predetermined proportion in an extruder; and ring-opening polymerizing the lactones at predetermined reaction temperature and fora predetermined period of reaction time, with the EVOH resin being in a molten state. By this method, a modified EVOH resin containing aliphatic polyester units having an average chain length of 1.5 or more can be produced.

A graft reaction is preferred as the polymerization reaction.

The amount of lactones to be used based on the amount of the EVOH resin may be properly selected so that the desired amount of the aliphatic polyester units can be obtained. The amount of lactones based on 100 parts by weight of the EVOH resin is typically 1 to 200 parts by weight, preferably 10 to 150 parts by weight, and particularly preferably 20 to 100 parts by weight. If the amount is too small, flexibility tends to be insufficient, and if, on the other hand, the amount is too large, the gas barrier property tends to deteriorate.

At least one selected from the group consisting of tin compound (referred to also as a "tin catalyst"), zinc compound (referred to also as a "zinc catalyst"), and titanium compound (referred to also as a "titanium catalyst") can be used as the ring-opening polymerization catalyst. Specific examples thereof include: tin alkoxides such as dibutyl dibutoxy tin, and tin ester compounds such as dibutyl tin diacetate; zinc chelates such as zinc (II) acetylacetonate and zinc acetylacetonate hydrate, and zinc alkoxides such as zinc i-propoxide and zinc t-butoxide; organic titanates such as tetraisopropyl titanate and tetrabutyl titanate; and metal complexes containing tin, zinc, or titanium. Among these compounds, a tin compound and/or a zinc compound are preferably used from the viewpoint of flexibility, and more preferably a tin compound or a zinc compound is selectively used.

The amount of the catalyst to be used based on 100 parts by weight of lactones is typically 0.01 to 10 parts by weight, preferably 0.1 to 5 parts by weight, and particularly preferably 0.15 to 3 parts by weight. From the viewpoint of ensuring the modification rate, it is also preferred that the amount of the catalyst is over 1 part by weight based on 100 parts by weight of the lactones. If the amount is too small, the modification rate tends to be deteriorated, and, if the amount is too large, on the other hand, the composition ratio of the modified EVOH resin tends to fluctuate, thereby making it impossible to achieve the effect of the present disclosure.

Where a graft reaction is employed as a polymerization reaction, the reaction temperature in the graft reaction is typically 50° C. to 250° C., preferably 100° C. to 240° C., and more preferably 150° C. to 230° C., which is the temperature at which the EVOH resin turns into a molten state. If the reaction temperature is too high, the modified EVOH resin tends to be thermally deteriorated. If the reaction temperature is too low, on the other hand, the graft reaction of the EVOH resin tends not to proceed, whereby the EVOH resin is left unmodified.

The temperature at which each material is fed in the graft reaction is typically room temperature, which is, for example, 10° C. to 40° C.

The reaction time in the graft reaction is typically 1 second to 1.5 hours, preferably 3 seconds to 1.25 hours, more preferably 5 seconds to 1 hour, and particularly preferably 7 seconds to 45 minutes. If the reaction time is too long, the modified EVOH resin tends to be thermally deteriorated, thereby causing a significant increase in viscosity in the modified EVOH resin and forming thermally degraded substances in the modified EVOH resin, whereby gel is formed when the modified EVOH resin is formed into a film and the like. If the reaction time is too short, on the other hand, the graft reaction of the EVOH resin tends not to proceed, whereby the EVOH resin is left unmodified.

The manufacturing apparatus is an extruder such as a single-screw extruder, a twin-screw extruder, a Banbury mixer, a kneader, or a Brabender (examples of the extruder include an extruder of TEX series available from The Japan Steel Works, Ltd., an extruder of HYPERKTX series available from Kobe Steel, Ltd., an extruder of TEM series available from Shibaura Machine Co., Ltd., and an extruder of KRC kneader series available from Kurimoto, Ltd.), and may be an apparatus that can continuously subject an EVOH resin to a ring-opening polymerization reaction through melt-kneading (referred to as a continuous-type method). The modified EVOH resin of the present disclosure cannot be produced by a conventional stirring apparatus used for batch-type method, such as a stirring manufacturing apparatus or a flask that cannot continuously subject an EVOH resin to a ring-opening polymerization reaction. In a continuous-type extruder, a shear force in melt-kneading is high and ring-opening polymerization advances rapidly, so it is possible to continuously subject an EVOH resin to a ring-opening polymerization, making it possible to manufacture the modified EVOH resin of the present disclosure.

The batch-type method refers to a method in which each material is simultaneously fed into a chemical reactor, and then the reaction is allowed to proceed at a predetermined temperature to synthesize the modified EVOH resin while raising the temperature and stirring the materials. Feeding of the materials and discharging of the modified EVOH resin are not performed at the same time.

The continuous-type method refers to a method in which each material is sequentially fed into an extruder, and then the reaction is allowed to proceed at a predetermined temperature to continuously synthesize the modified EVOH resin while stirring the materials. Feeding of the materials and discharging of the modified EVOH resin are performed at the same time.

The average chain length of the aliphatic polyester units in the modified EVOH resin is 1.5 or more, preferably 1.6 to 3, more preferably 1.6 to 2.5, and particularly preferably 1.6 to 2.3. If the average chain length of the aliphatic polyester units is too short, the melting point tends to decrease too much.

The average chain length of the aliphatic polyester units in the modified EVOH resin can be calculated from the result of $^1$H-NMR measurement.

The modification rate in the modified EVOH resin is typically 1 mol % or more, preferably 1.5 mol % or more, more preferably 2 mol % to 30 mol %, and particularly preferably 2.5 mol % to 20 mol %, especially preferably 3 mol % to 15 mol %. The modification rate refers to the percentage of structural units of the EVOH resin onto which the aliphatic polyester is grafted as compared to all the structural units of the EVOH resin. If the modification rate in the modified EVOH resin is too low, the flexibility tends to be deteriorated, and, if the modification rate in the modified EVOH resin is too high, the melting point tends to decrease too much.

The modification rate in the modified EVOH resin can be calculated from the result of $^{1}$H-NMR measurement.

It is preferred that the relationship between the value of the modification rate in the modified EVOH resin (mol %) and the value of the average chain length of the aliphatic polyester units (number of units) is (the value of the average chain length)<(the value of the modification rate). More specifically, the ratio (the value of the modification rate)/(the value of the average chain length) is typically 0.6 to 20, preferably 1.1 to 15, more preferably 1.3 to 10, particularly preferably 1.5 to 5, and especially preferably 2 to 3.5. Where the condition of (the value of the average chain length)<(the value of the modification rate) is satisfied, the effect can be enhanced so that the modified EVOH resin has excellent flexibility and that a significant decrease in the melting point of the modified EVOH resin is suppressed.

The melting point of the modified EVOH resin is typically 40° C. to 200° C., preferably 60° C. to 180° C., more preferably 80° C. to 160° C., particularly preferably 90° C. to 150° C., and especially preferably 100° C. to 140° C. If the melting point of the modified EVOH resin is too high, flexibility tends to be deteriorated. If the melting point of the modified EVOH resin is too low, the gas barrier property tends to be deteriorated and it is difficult to use the modified EVOH resin for uses where heat resistance is required.

The grafting of the aliphatic polyester weakens intermolecular force, such as hydrogen bonds, between hydroxyl groups in the EVOH resin of the skeleton. Therefore, if the modification rate in the modified EVOH resin increases, the melting point of the modified EVOH resin tends to decrease.

The melting point of the modified EVOH resin can be measured by using a differential scanning calorimeter.

The modified EVOH resin, according to the present disclosure, has an average chain length of the aliphatic polyester units of 1.5 or more. In addition to this, it is preferred that the modification rate is 1.5 mol % or more because it allows the modified EVOH resin to have excellent flexibility and it can suppress a significant decrease in the melting point of the modified EVOH resin.

In order to satisfy the above ranges of both the average chain length and the modification rate, it is necessary to select a tin compound and/or a zinc compound as a ring-opening polymerization catalyst to be used for production of the modified EVOH resin, and to allow the reaction to proceed by the continuous type method using an extruder. It is more preferred that the tin compound or the zinc compound is selectively used as a ring-opening polymerization catalyst.

The modified EVOH resin, according to the present disclosure, is typically an EVOH resin modified by using at least one selected from the group consisting of a tin compound, a zinc compound, and a titanium compound as a ring-opening polymerization catalyst. Preferably, the modified EVOH resin, according to the present disclosure, is an EVOH resin modified by using at least one of the tin compound and the zinc compound as a ring-opening polymerization catalyst.

Therefore, the modified EVOH resin, according to the present disclosure, typically contains at least one selected from the group consisting of tin, zinc, and titanium. Of these, it is preferred that the modified EVOH resin contains tin and/or zinc.

The total amount of tin, zinc and titanium in the modified EVOH resin is typically 25 μg/g or more, preferably 100 μg/g to 1000000 μg/g, more preferably 200 μg/g to 100000 μg/g, particularly preferably 500 μg/g to 50000 μg/g, and especially preferably 1000 μg/g to 10000 μg/g. If the amount falls within the above range, the effects of the present disclosure can be achieved more easily.

Additives generally blended to the EVOH resin may be added to the modified EVOH resin, as long as the effects of the present disclosure are not impaired. (The amount of such additives is, for example, 5 wt. % or less of the modified EVOH resin.) Examples of the additives include heat stabilizer, antioxidant, antistatic agent, colorant, UV absorber, lubricant, plasticizer, photo stabilizer, surfactant, antibacterial agent, desiccant, antiblocking agent, flame retardant, crosslinking agent, curing agent, foaming agent, crystal nucleating agent, antifogging agent, biodegradable additive, silane coupling agent, and oxygen absorber, which may be used alone or in combination.

Additives may be used, as the heat stabilizer, for improvement of various physical properties such as heat stability in melt forming. Examples of the heat stabilizer include organic acids such as acetic acid, propionic acid, butyric acid, lauryl acid, stearic acid, oleic acid, and behenic acid, and salts such as alkali metal salts (sodium salts, potassium salts, and the like), alkali earth metal salts (calcium salts, magnesium salts, and the like), and zinc salts of the organic acids; and inorganic acids such as sulfuric acid, sulfurous acid, carbonic acid, phosphoric acid, and boric acid, and salts such as alkali metal salts (sodium salts, potassium salts, and the like), alkali earth metal salts (calcium salts, magnesium salts, and the like), and zinc salts of the inorganic acids, which may be used alone or in combination.

Of these, acetic acid, a boron compound containing boric acid and salts thereof, acetic acid salts, and phosphoric acid salts are particularly preferred.

Where acetic acid is added, the amount of acetic acid is typically 0.001 to 1 part by weight, preferably 0.005 to 0.2 parts by weight, and particularly preferably 0.01 to 0.1 parts by weight based on 100 parts by weight of the modified EVOH resin. If the amount of acetic acid added is too small, the effect of adding acetic acid tends not to be sufficiently achieved, and, if the amount is too large, on the other hand, it tends to be difficult to obtain a homogeneous film.

Where the boron compound is added, the amount of the boron compound is typically 0.001 to 1 part by weight, preferably 0.002 to 0.2 parts by weight, and particularly preferably 0.005 to 0.1 parts by weight on a boron basis based on 100 parts by weight of the modified EVOH resin (the amount is analyzed by ICP emission spectrometry analysis after ashing). If the amount of the boron compound added is too small, the effect of adding the boron compound may not be sufficiently achieved, and, if the amount is too large, on the other hand, it tends to be difficult to obtain a homogeneous film.

The amount of acetic acid salts and phosphoric acid salts (including hydrogen phosphate) to be added is typically 0.005 to 0.1 parts by weight, preferably 0.001 to 0.05 parts by weight, and particularly preferably 0.002 to 0.03 parts by weight on a metal basis based on 100 parts by weight of the modified EVOH resin (the amount is analyzed by ICP emission spectrometry analysis after ashing). If the amount is too small, the effect of adding the additives may not be sufficiently achieved, and, if the amount is too large, on the other hand, it tends to be difficult to obtain a homogeneous film. Where two or more kinds of salts are added to the modified EVOH resin, it is preferred that the total amount thereof falls within the above range of the amount of the additives.

Where alkali metal salts are used as salts, the amount of the alkali metal added is typically 10 ppm to 2,000 ppm, preferably 25 ppm to 1,000 ppm, and particularly preferably 50 ppm to 500 ppm based on the weight of the modified EVOH resin. If the amount is too large, defective coloring tends to occur, and, if the amount is too small, on the other hand, the interlayer adhesive property tends to be deteriorated.

The methods of adding acetic acid, a boron compound, acetic acid salts, and phosphoric acid salts to the modified EVOH resin are not particularly limited. Exemplary methods include a method in which a graft reaction of the EVOH resin containing the additives prepared by the following methods (i) to (iv) and lactones is allowed to proceed, a method in which the additives are added in the step of ring-opening polymerizing the lactones, and a method in which the modified EVOH resin is treated by the following methods (v) to (vi).

Exemplary methods of adding additives such as the acetic acid, the boron compound, the acetic acid salts, and the phosphoric acid salts to the EVOH resin include:

(i) a method in which porous precipitates of the EVOH resin having a water content of 20 wt % to 80 wt. % are brought into contact with a solution of the additives to allow the porous precipitates of the EVOH resin to contain the additives and then dry the resultant mixture;

(ii) a method in which a homogeneous solution of the EVOH resin (such as water/alcohol mixed solution) is allowed to contain the additives, the resulting solution is extruded into strands in a solidification liquid, the resulting strands are cut into pellets, and the resulting pellets are dried;

(iii) a method in which the EVOH resin and the additives are simultaneously mixed together and the resultant mixture is melt-kneaded in an extruder or the like; and (iv) a method in which, in the step of preparing the EVOH resin, alkali (such as sodium hydroxide and potassium hydroxide) used in the saponification step is neutralized using organic acids such as acetic acid, and then the amount of the remaining organic acids and byproduct salts is adjusted by adjusting the degree of the washing treatment.

In order to achieve more remarkable effects of the present disclosure, the methods (i) and (ii) having excellent dispersibility of the additives are preferred, and, where organic acids and salts thereof are added, the method (iv) is preferred.

Exemplary methods of adding additives such as the acetic acid, the boron compound, the acetic acid salts, and the phosphoric acid salts to the modified EVOH resin include:

(v) a method in which the modified EVOH resin is brought into contact with a solution of the additives to allow the modified EVOH resin to contain the additives and then dry the resultant mixture; and (vi) a method in which the modified EVOH resin and the additives are simultaneously mixed together and the resultant mixture is melt-kneaded in an extruder or the like.

It is also possible to blend two or more different kinds of modified EVOH resins together, or to blend a modified EVOH resin and an ordinary EVOH resin together.

<Use for Modified EVOH Resin>

The modified EVOH resin of the present disclosure thus obtained can be molded into, for example, films, sheets, cups, bottles, and the like, through melt molding. As methods of the melt molding, extrusion molding methods (T-die extrusion, inflation extrusion, blow molding, melt spinning, heterogeneous extrusion, etc.) and injection molding methods are mainly employed. In many cases, the melt-molding temperature is typically selected from the range of 150° C. to 300° C.

The molded resin may be directly used for various purposes, but it is typical that the molded resin and some other base material are stacked into a laminate so that the strength of the molded resin is further increased and other functions are imparted thereto.

A thermoplastic resin is useful for the other base material. Examples of the thermoplastic resin include polyethylenes such as linear low-density polyethylene, low-density polyethylene, very-low-density polyethylene, medium-density polyethylene, and high-density polyethylene, polypropylene, ethylene-propylene (block and random) copolymers; polyolefins such as a propylene-α-olefin (α-olefin having 4 to 20 carbon atoms) copolymers, polybutene, and polypentene; graft-modified polyolefins obtained through graft modification of any of the aforementioned polyolefins with an unsaturated carboxylic acid or an ester thereof; and ionomers, ethylene-vinyl acetate copolymers, ethylene-acrylic acid copolymers, ethylene-acrylic acid ester copolymers, polyester resins, polyamide resins (also including copolyamide), polyvinyl chloride, polyvinylidene chloride, acrylic resins, polystyrene, vinyl ester resins, polyester elastomers, polyurethane elastomers, halogenated polyolefins such as chlorinated polyethylene and chlorinated polypropylene, aromatic polyketones, aliphatic polyketones, and polyalcohols obtained by reduction of the aforementioned polyketones. A polyolefin resin and a polyamide resin are preferable from the viewpoint of practicality such as physicality (particularly, strength) of the laminate, and, specifically, polyethylenes and polypropylenes are preferably used. These thermoplastic resins may be used alone, or two or more of these may be used in combination.

The base material may contain a conventionally known antioxidant, antistatic agent, lubricant, nucleating agent, antiblocking agent, UV absorber, wax, and the like, in amounts that do not impair the effects of the present disclosure.

The modified EVOH resin of the present disclosure and the other base material may be laminated together by a known laminating method. Exemplary laminating methods include a laminating method in which the other base material is melt-extruded onto a film or a sheet of the modified EVOH resin of the present disclosure; a laminating method in which the resin is melt-extruded onto the other base material; a method in which the resin and the other base material are coextruded; a method in which the resin (layer) and the other base material (layer) are dry-laminated together with the use of a known adhesive agent such as of organic titanium compound, isocyanate compound, polyester compound or polyurethane compound; and a method in which a solution of the resin is applied on the other base material, and then a solvent is removed from the applied solution.

Of these methods, the coextrusion method is preferred from the viewpoint of costs and environmental concerns.

Where layers a (a1, a2, . . . ) formed from the modified EVOH resin of the present disclosure and thermoplastic resin layers b (b1, b2, . . . ) are laminated together to produce a laminate, the layered configuration of the laminate is not limited to a double-layer structure a/b, but may be any combination of these layers, e.g., b/a/b, a/b/a, a1/a2/b, a/b1/b2, b2/b1/a/b1/b2, b2/b1/a/b1/a/b1/b2, or the like. The layered configuration may be b/R/a, b/R/a/b, b/R/a/R/b, b/a/R/a/b, b/R/a/R/a/R/b, or the like, wherein R is a recycled layer formed from a mixture obtained by re-melting cutoff pieces and defective products occurring during the production of the laminate and containing the EVOH resin and the thermoplastic resin.

In the aforementioned layered configuration, as required, an adhesive resin layer containing an adhesive resin may be provided between the layers, and known adhesive resins are usable as the adhesive resin. The adhesive resin may be properly selected according to the type of the resin to be used for the layers b. A typical example of the adhesive resin is a modified olefin polymer having a carboxy group prepared by chemically bonding an unsaturated carboxylic acid or its anhydride to a polyolefin resin by an addition reaction, a graft reaction or the like. Examples of the modified olefin polymer having a carboxy group include maleic anhydride graft-modified polyethylene, maleic anhydride graft-modified polypropylene, maleic anhydride graft-modified ethylene-propylene (block and random) copolymers, maleic anhydride graft-modified ethylene-ethyl acrylate copolymers, or maleic anhydride graft-modified ethylene-vinyl acetate copolymers. These adhesive resins may each be used alone, or two or more of these adhesive resins may be used as a mixture. It is also possible to blend, with these adhesive resins, the modified EVOH resin of the present disclosure or another EVOH resin, polyisobutylene, a rubber elastomer component such as ethylene-propylene rubber, a resin of the b layer, or the like. In particular, blending a polyolefin resin other than the polyolefin resin that serves as a base of the adhesive resin may improve adhesiveness, and is, thus, useful.

The aforementioned laminate is then subjected to a (heating) stretching treatment as necessary. This (heating) stretching treatment means operation for uniformly molding a thermally uniformly heated laminate in a film or sheet shape into a tube or film shape using a chuck, a plug, vacuum force, air pressure force, blowing, or the like. The stretching treatment may be either uniaxial stretching or biaxial stretching, and the biaxial stretching may be either simultaneous stretching or sequential stretching.

Exemplary methods for the stretching process include roll stretching method, tenter stretching method, tubular stretching method, stretch blowing method, and vacuum pressure forming method, each having a higher stretch ratio. The biaxial stretching process may be a simultaneous stretching process or a sequential stretching process. A temperature for the stretching is typically selected from a range of about 40° C. to about 170° C., and preferably about 60° C. to about 160° C. If the stretching temperature is too low, the stretchability tends to be poorer. If the stretching temperature is too high, it tends to be difficult to ensure stable stretching.

The laminate may be further subjected to a heat-setting process to ensure dimensional stability after the stretching. The heat-setting process may be performed in a known manner. For example, the stretched film is typically heat-treated at 80° C. to 180° C., and preferably 100° C. to 165° C., for about 2 seconds to about 600 seconds, while being kept tense.

Where the stretched multilayer film produced by using a laminate comprising a layer containing the EVOH resin of the present disclosure is used as a shrinkable film, the stretched film may be cold-set so as to be imparted with a heat-shrinkable property, for example, by applying cold air over the stretched film without performing the above heat-setting process.

The thicknesses of the thermoplastic resin layer and the adhesive resin layer of the laminate vary depending upon the layered configuration, the type of the thermoplastic resin, the type of the adhesive resin, the use purpose, the package shape, the required physical properties, and the like, of the laminate. The thickness of the thermoplastic resin layer is typically selected from the range of about 10 μm to about 1,000 μm, and preferably about 50 μm to about 500 μm, and the thickness of the adhesive resin layer is typically selected from the range of about 5 μm to about 500 μm, and preferably about 10 μm to about 250 μm.

The thickness of the layer formed from the modified EVOH resin of the present disclosure varies depending on the required gas barrier property, but it is typically 5 μm to 500 μm, preferably 10 μm to 250 μm, and particularly preferably 20 μm to 100 μm. If the thickness is too small, the gas barrier property tends to be insufficient, and, if the thickness is too large, on the other hand, flexibility of the film tends to be insufficient.

Where the laminate obtained is extrusion-coated with some other base material, or where a film or a sheet of the laminate and a film or a sheet of the other base material are laminated together with the use of the adhesive agent, usable examples of the base material other than the thermoplastic resins described above include paper, metal foil, uniaxially or biaxially stretched plastic film or sheet, film or sheet on which an inorganic compound is vapor-deposited, woven fabric, nonwoven fabric, metal fiber material and wood material.

Bags, cups, trays, tubes, bottles, and other containers and lid materials produced from the film, the sheet or the stretched film formed in the aforementioned manner are useful as packaging-material containers for general foods, condiments such as mayonnaise and dressing, fermented foods such as miso, fat and oil such as salad oil, beverages, cosmetics, pharmaceutical products, and the like.

EXAMPLES

The embodiments of the present disclosure will hereinafter be described more specifically by way of examples thereof. It should be understood that the present disclosure is not limited to the following examples within the scope of the disclosure. In the following description, "parts" and "%" are based on weight, unless otherwise specified.

Example 1

[Production of Modified EVOH Resin]

100 parts of an EVOH resin (ethylene content 44 mol %, saponification degree of a vinyl acetate portion 99.8 mol %, MFR 12 g/10 min (210° C., a load of 2,160 g)), 30 parts of ε-caprolactone (PLACCEL M available from Daicel Corporation), and 0.9 parts (3 parts based on 100 parts of ε-caprolactone) of tin 2-ethylhexanoate (NEOSTANN U-28 available from Nitto Kasei Co., LTD.) were fed into a twin-screw kneading extruder (TEX30α available from The Japan Steel Works, Ltd.) and were conveyed to a melting section set to a residence time of 2 to 3 minutes, where they were melt-kneaded to undergo a reaction, and a modified EVOH resin was obtained.

The twin-screw kneading extruder has the following temperature patterns:

C2=80° C., C3=80° C., C4=150° C., C5=150° C., C6=230° C., C7=230° C., C8=230° C., C9=230° C., 010=230° C., C11=230° C., C12=230° C., C13=230° C., C14=230° C., C15=230° C., C16=230° C., and D=230° C.

Example 2

A modified EVOH resin was produced in the same manner as in Example 1, except that the amount of the tin 2-ethylhexanoate was 0.3 parts (1 part based on 100 parts of ε-caprolactone)

Example 3

A modified EVOH resin was produced in the same manner as in Example 1, except that the amount of the ε-caprolactone was 40 parts and the amount of the tin 2-ethylhexanoate was 1.2 parts (3 parts based on 100 parts of ε-caprolactone)

Example 4

A modified EVOH resin was produced in the same manner as in Example 1, except that the amount of the ε-caprolactone was 50 parts and the amount of the tin 2-ethylhexanoate was 1.5 parts (3 parts based on 100 parts of ε-caprolactone)

Example 5

A modified EVOH resin was produced in the same manner as in Example 1, except that 0.3 parts (1 part based on 100 parts of ε-caprolactone) of zinc acetylacetonate monohydrate (NACEM Zinc, available from NIHON KAGAKU SANGYO CO., LTD.) was used instead of the tin 2-ethylhexanoate.

Example 6

A modified EVOH resin was produced in the same manner as in Example 1, except that 0.03 parts (0.1 parts based on 100 parts of ε-caprolactone) of tetra-n-butyl titanate (ORGATIX TA-21 available from Matsumoto Fine Chemical Co. Ltd.) was used instead of the tin 2-ethylhexanoate.

Comparative Example 1

100 parts of the EVOH resin of Example 1 and 30 parts of ε-caprolactone were fed into a flask, and then 0.03 parts of the tetrabutyl titanate (0.1 parts based on 100 parts of ε-caprolactone) was further fed thereinto. The temperature was raised by 1° C. for 2 to 3 minutes while the resultant mixture was being stirred in a nitrogen stream. Thereafter, the reaction was allowed to proceed at 180° C. to 200° C. for 6 hours. Thus, a modified EVOH resin was produced by batch-type method.

[Measurement of Modification Rate and Average Chain Length]

The modification rate in the modified EVOH resin and the average chain length of the aliphatic polyester units were calculated by $^1$H-NMR measurement under the following conditions.

(a) $^1$H-NMR Measurement Conditions

Apparatus: Ascend 400 (400 MHz NMR) (available from Bruker Corporation)

Internal standard material: Tetramethylsilane

Solvent: d6-DMSO

Measured polymer concentration: 5% (0.05 g of sample and 1 mL of solvent)

Measurement temperature: 50° C. (323K)

Irradiation pulse: 45° pulse

Pulse interval: 10 sec

Number of totalizations: 16

(b) Attribution of Resonance Absorption Peaks (I) 0.8 to 0.9 ppm: —$CH_3$ at an end of a modified EVOH resin (II) 1.0 to 1.9 ppm: —$CH_2$— in the main chain of the modified EVOH resin, and —$CH_2$— adjacent to each other in aliphatic polyester (III) 2.0 ppm: —$CH_3$ of residual acetyl group of the modified EVOH resin (IV) 2.1 to 2.3 ppm: —$CH_2$— adjacent to carboxy group of aliphatic polyester (V) 3.3 to 4.0 ppm: —CH— adjacent to —OH of the modified EVOH resin, and —$CH_2$— adjacent to —OH of aliphatic polyester (VI) 4.0 to 4.7 ppm: —OH of the modified EVOH resin and aliphatic polyester, and —$CH_2$— adjacent to ester bond of aliphatic polyester (c) Calculation of Modification Rate and Average Chain Length of Aliphatic Polyester Using the integral values of the resonance absorption peaks in (I) to (VI), the simultaneous equations (i) to (vi) were formulated, and the amount of graft modified groups C (mol) and the average chain length n (number of units) of the aliphatic polyester were calculated from the solutions of the simultaneous equations. Furthermore, the graft modification rate X (mol %) of the aliphatic polyester was calculated from equation (vii).

$$3\times M=[\text{integral value of peak }(I)] \quad \text{Equation (i)}$$

$$(2\times M)+(2\times A)+(4\times E)+(2\times O)+(6\times n+2)\times C=[\text{integral value of peak }(II)] \quad \text{Equation (ii)}$$

$$3\times A=[\text{integral value of peak }(III)] \quad \text{Equation (iii)}$$

$$2\times n\times C=[\text{integral value of peak }(IV)] \quad \text{Equation (iv)}$$

$$O+(2\times C)=[\text{integral value of peak }(V)] \quad \text{Equation (v)}$$

$$O+(2\times n-1)\times C=[\text{integral value of peak }(VI)] \quad \text{Equation (vi)}$$

$$X=C/(M+A+O+C+E)\times 100 \quad \text{Equation (vii)}$$

Where M, A, O, C, n, E, and X represent the following values.

M: Amount of methyl groups at ends of modified EVOH resin (mol)

A: Amount of acetyl groups in the modified EVOH resin (mol)

O: Amount of hydroxyl groups in the modified EVOH resin (mol)

C: Amount of aliphatic polyester graft-modified groups in the modified EVOH resin (mol)

n: Average chain length of aliphatic polyester (number of units)

E: Amount of ethylene groups in the modified EVOH resin (mol)

X: Aliphatic polyester graft modification rate of the modified EVOH resin (mol %)

[Flexibility Measurement]

A film having a thickness of 150 μm was punched into a JIS-3 dumbbell shape, and the obtained dumbbell-shaped samples were subjected to tensile testing using a tensile testing machine (desktop-type precision universal testing machine AGS-X available from Shimadzu Corporation). Flexibility was evaluated based on the constant elongation modulus obtained by this tensile testing (measurements conditions conform to JIS K6251).

[Flexibility Evaluation]

1: Very good (very soft)
2: Good (soft)
3: Intermediate
4: Poor (hard)
5: Very poor (very hard)

The flexibility evaluation is a relative evaluation, wherein the flexibility of the modified EVOH resin of Example 1 was defined as 3. A modified EVOH resin having any of the above ratings 1 to 5 is more flexible than an unmodified EVOH resin (that is, the modified EVOH resin is softer than an unmodified EVOH resin).

[Melting-Point Measurement]

The melting point of the obtained modified EVOH resin was measured by thermal analysis using a differential scanning calorimetry (DSC-Q2000 available from TA Instruments, Inc.).

The results of the measurement of the average chain length (number of units), the modification rate (mol %), flexibility, and the melting point (° C.) of the modified EVOH resin produced in the Examples 1 to 6 and Comparative Example 1 are shown below in table 1.

On the other hand, the modified EVOH resin of Comparative Example 1, in which the graft reaction was allowed to proceed by batch-type method using 0.1 parts of the titanium catalyst based on 100 parts of ε-caprolactone, had high modification rate but had short average chain length and a significantly decreased melting point.

This indicates that a modified EVOH resin in which decrease in the melting point is suppressed can be produced, where the graft reaction is allowed to proceed by continuous-type method using a twin-screw extruder using a tin compound, a zinc compound, or a titanium compound as a polymerization catalyst. This also indicates that a modified EVOH resin that has excellent flexibility and in which decrease in the melting point is suppressed can be produced, where the graft reaction is allowed to proceed by continuous-type method using a twin-screw extruder using a tin compound or a zinc compound as a polymerization catalyst. On the other hand, where the graft reaction is allowed to proceed by batch-type method, it is impossible to produce a modified EVOH resin in which decrease in the melting point is suppressed.

TABLE 1

| | Production method | ε-caprolactone amount (parts*[1]) | Catalyst | Catalyst amount (parts*[2]) | Average chain length (number of units) | Modification rate (mol %) | Flexibility | Melting point (° C.) |
|---|---|---|---|---|---|---|---|---|
| Example 1 | Continuous type (twin-screw extruder) | 30 | Tin catalyst | 3 | 1.8 | 4.8 | 3 | 117 |
| Example 2 | Continuous type (twin-screw extruder) | 30 | Tin catalyst | 1 | 1.8 | 4.5 | 3 | 126 |
| Example 3 | Continuous type (twin-screw extruder) | 40 | Tin catalyst | 3 | 2.2 | 6.0 | 2 | 109 |
| Example 4 | Continuous type (twin-screw extruder) | 50 | Tin catalyst | 3 | 2.3 | 6.6 | 1 | 104 |
| Example 5 | Continuous type (twin-screw extruder) | 30 | Zinc catalyst | 1 | 1.6 | 5.2 | 3 | 120 |
| Example 6 | Continuous type (twin-screw extruder) | 30 | Titanium catalyst | 0.1 | 1.6 | 1.3 | 5 | 146 |
| Comparative Example 1 | Batch type (reaction vessel) | 30 | Titanium catalyst | 0.1 | 1.4 | 7.2 | 1 | 95 |

*[1]ε-caprolactone amount (part) based on 100 parts of EVOH resin.
*[2]Catalyst amount (part) based on 100 parts of ε-caprolactone.

The results shown in Table 1 indicate that a significant decrease in melting point was suppressed in the modified EVOH resins of Examples 1 to 6 in which the graft reaction was allowed to proceed by the continuous-type method using a twin-screw extruder using the tin compound, the zinc compound or the titanium compound as the polymerization catalyst.

The modified EVOH resins of Examples 1 to 5, in which the tin compound or the zinc compound was used as the polymerization catalyst, had high modification rate and excellent flexibility.

While specific forms of the embodiments of the present disclosure have been shown in the aforementioned examples, the examples are merely illustrative but not limitative. It is contemplated that various modifications apparent to those skilled in the art could be made within the scope of the disclosure.

The modified EVOH resin of the present disclosure is a modified EVOH resin that has the excellent gas barrier property and in which a significant decrease in the melting point is suppressed. Therefore, the modified EVOH resin is widely useful as a barrier material, including uses where heat resistance is required.

The invention claimed is:

1. A modified ethylene-vinyl alcohol resin comprising aliphatic polyester units, wherein an average chain length of the aliphatic polyester units in the modified ethylene-vinyl alcohol resin is 1.5 or more and 2.5 or less, wherein the modified ethylene-vinyl alcohol resin further comprises at least one selected from the group consisting of tin, zinc, and titanium, in an amount of 100 μg/g or more.

2. The modified ethylene-vinyl alcohol resin according to claim 1, wherein the modified ethylene-vinyl alcohol resin has a modification rate of 1.5 mol % or more.

3. The modified ethylene-vinyl alcohol resin according to claim 1, wherein the aliphatic polyester unit comprises a ring-opening polymer of lactones.

4. The modified ethylene-vinyl alcohol resin according to claim 1, wherein the modified ethylene-vinyl alcohol resin is an ethylene-vinyl alcohol resin modified by using at least one of a tin compound and a zinc compound as a ring-opening polymerization catalyst.

5. A method for producing the modified ethylene-vinyl alcohol resin according to claim 1, comprising ring-opening polymerizing the lactones by using at least one ring-opening polymerization catalyst selected from the group consisting of the tin compound, the zinc compound, and a titanium compound in an extruder with the ethylene-vinyl alcohol resin present in the extruder.

6. The method for producing the modified ethylene-vinyl alcohol resin according to claim 5, wherein the ring-opening polymerization catalyst is at least one of the tin compound and the zinc compound.

7. The method for producing the modified ethylene-vinyl alcohol resin according to claim 5, wherein an amount of the ring-opening polymerization catalyst is over 1 part by weight based on 100 parts by weight of the lactones.

8. The modified ethylene-vinyl alcohol resin according to claim 1, wherein an average chain length of the aliphatic polyester units in the modified ethylene-vinyl alcohol resin is 1.6 or more and 2.3 or less.

9. The modified ethylene-vinyl alcohol resin according to claim 1, wherein the modified ethylene-vinyl alcohol resin has a modification rate of 2 mol % or more and 30 mol % or less.

10. The modified ethylene-vinyl alcohol resin according to claim 1, wherein the modified ethylene-vinyl alcohol resin has a modification rate of 2.5 mol % or more and 20 mol % or less.

* * * * *